United States Patent [19]

Pinault et al.

[11] Patent Number: 5,465,394
[45] Date of Patent: Nov. 7, 1995

[54] DEVICE FOR FIXING THE DURATION OF WAITING PERIODS BETWEEN ATTEMPTS TO ESTABLISH A CONNECTION BETWEEN A TERMINAL AND A MOBILE RADIO SYSTEM

[75] Inventors: Francis Pinault; Christophe Jouin, both of Bois-Colombes, France

[73] Assignee: Alcatel Radiotelephone, Paris, France

[21] Appl. No.: 166,958

[22] Filed: Dec. 15, 1993

[30] Foreign Application Priority Data

Dec. 16, 1992 [FR] France .................................. 92 15202

[51] Int. Cl.⁶ ................................................. H04B 1/034
[52] U.S. Cl. .......................... 455/54.1; 455/343; 455/127; 455/34.2
[58] Field of Search .................... 455/343, 38.3, 455/127, 54.1, 126, 34.1, 34.2, 33.1, 54.2; 379/59, 58

[56] References Cited

U.S. PATENT DOCUMENTS

| | | |
|---|---|---|
| 4,908,523 | 3/1990 | Snowden et al. . |
| 5,115,182 | 5/1992 | Ehmke et al. ............................ 455/89 |
| 5,140,310 | 8/1992 | DeLuca et al. .................... 340/825.44 |
| 5,257,408 | 10/1993 | Olson et al. ........................... 455/54.1 |
| 5,304,986 | 4/1994 | Montegi ................................. 340/636 |

FOREIGN PATENT DOCUMENTS 0490441  6/1992  European Pat. Off. .
0513710  11/1992  European Pat. Off. .

Primary Examiner—Reinhard J. Eisenzopf
Assistant Examiner—Doris To
Attorney, Agent, or Firm—Sughrue, Mion, Zinn, Macpeak & Seas

[57] ABSTRACT

A device for seeking a connection between a terminal and a mobile radio system includes a synchronization unit for establishing in response to a control signal if the connection can be achieved and a time-delay unit for producing, after an initial period, the control signal after a first waiting period. The time-delay unit produces the control signal again after a second waiting period if it is established that the connection cannot be achieved after the first waiting period. The time-delay unit fixes the duration of the second waiting period so that it is greater than that of the first waiting period. If the device is implemented in a terminal having a battery whose capacity is represented by a capacity indicator, the time-delay unit fixes at least one of the waiting periods according to the capacity indicator.

6 Claims, 1 Drawing Sheet

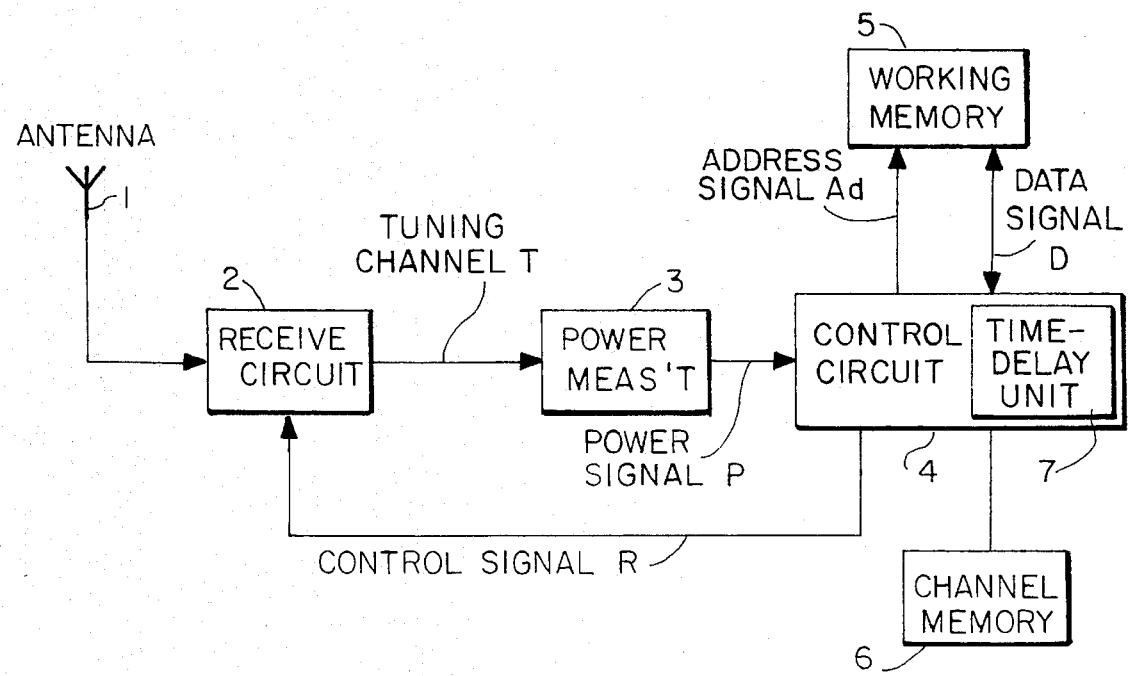

DEVICE FOR FIXING THE DURATION OF WAITING PERIODS BETWEEN ATTEMPTS TO ESTABLISH A CONNECTION BETWEEN A TERMINAL AND A MOBILE RADIO SYSTEM

BACKGROUND OF THE INVENTION

1. Field of the Invention

The present invention concerns a device for seeking a connection between a terminal and a mobile radio system.

2. Description of the Prior Art

In mobile radio systems such as the GSM paneuropean digital mobile radio system, for example, a terminal communicates with a base station by way of communication channels conveying radio signals. These systems comprise a plurality of channels for transmissions from the terminals to the base stations or for transmissions from the base stations to the terminals.

These channels include a control channel which is transmitted continuously and which enables a terminal to access the system via the base station transmitting this channel in order to set up calls. The terminal must therefore identify this control channel in order to acquire the information enabling it to declare itself in the system. This information includes synchronization information and for this reason this procedure is usually called the synchronization procedure.

A two-stage method is usually adopted to achieve synchronization. In a first stage the terminal measures the power on all received channels. The terminal then attempts to synchronize with the channel received at the highest power. If it fails to do so it tries the other channels in decreasing received power order until it is able to synchronize. This method is that which is the subject of GSM Recommendations 4.08 version 3.11.0 and 5.08 version 3.7.0.

The synchronization procedure is carried out systematically whenever the terminal is switched on and also, and more generally, after any loss of synchronization, i.e. if the radio link carried in particular by the control channel between the base station and the terminal is interrupted. This interruption may be deliberate, for example switching off of the terminal, or accidental. The terminal may be temporarily unable to synchronize because of unsatisfactory radio reception conditions. This applies in a tunnel, for example, or more generally whenever it is in a shadow area in the sense in which this term is used in the radio art.

The synchronization procedure used in most cases is of particular benefit if the mobile radio system comprises a plurality of radio networks usually managed by different operators, each network covering a territory corresponding to all of a country or to one or more regions within a country. These radio networks are connected to the cable networks of the corresponding countries so that a mobile radio system terminal can communicate with a cable network terminal.

There may be several radio networks in the same country, their coverage areas overlapping partly or totally. Then, if a terminal wishes to access the mobile radio system, because there is a choice the question arises which radio network it will connect to. To this end the terminal includes a connection seeking device to establish a list of the radio networks to which it could connect.

A particular terminal which can operate throughout the mobile radio system is affiliated to a specific radio network, the home network, in just the same way as a telephone terminal is affiliated to a specific cable network. The reason for this is that the terminal is the means of obtaining services such as speech or data communication provided by the network operator who needs to know the identity of the terminal, in order to bill for the services provided if for no other reason.

It is desirable for priority to be given to connecting a terminal to its home network. The terminal user has an agreement with an operator who provides certain services that a different operator may not necessarily be able to supply; this applies to data communications, for example. Also, if a terminal connects to a radio network that it is convenient to refer to as a "visitor" network separate from its home network, this presupposes that the two operators concerned have an agreement authorizing such connection. This is not always the case, but assuming that it is, it is necessary for information to be exchanged between the two networks for the terminal's calls to be managed. The first item to come to mind is the cost of the service provided on the visitor network which must be passed on to the terminal's home network in order for the user to be billed accordingly.

It is therefore known for the connection seeking device of a terminal to be activated regularly either by manual action of the user or automatically when the terminal is connected to a visitor network of the same country as its home network, so that it breaks the connection with the visitor network to establish a new connection with the home network. This procedure is the subject matter of GSM Recommendation 03.22 version 4.0.0.

This connection seeking device uses the synchronization procedure previously defined because, before establishing whether it is possible to connect to a network, it is necessary to synchronize to a control channel transmitted by the network.

Generalizing these considerations, it follows that the connection seeking device is essential, whether the terminal is able to choose the network to which it can connect or not. The device comprises at least a synchronization unit to implement the synchronization procedure.

The synchronization unit is usually controlled by a time-delay unit. During an initial period of fixed duration the time-delay unit controls the synchronization unit continuously until synchronization is achieved on one control channel at least. If synchronization is not achieved at the end of this initial period the time-delay unit ceases to control the synchronization unit for a first waiting period before causing it to try again. If synchronization is still not achieved at the end of this first waiting period the time-delay unit initiates a second waiting period after which a further attempt is made. The time-delay unit therefore controls the synchronization unit periodically, the successive waiting periods between the various attempts at synchronization having the same duration. This solution is that adopted by the GSM in the specific case of home network seeking, the subject matter of Recommendation 02.11 version 4.2.0.

The connection seeking device naturally consumes power for as long a synchronization is not achieved, which reduces the operating time between battery recharging/replacement in the case of a terminal with a limited capacity battery.

This being so, European patent application EP 0 490 441 discloses a connection seeking device in which the time-delay unit comprises means for fixing the duration of the second waiting period so that it is longer than the first waiting period.

Thus as time passes the waiting periods get longer, the effect of which is to reduce power consumption. However, the longer waiting periods naturally tend to delay terminal synchronization, which is undesirable from the terminal user's point of view.

An object of the present invention is accordingly to achieve a compromise between reducing power consumption and increasing the availability of the terminal.

SUMMARY OF THE INVENTION

The invention consists in a device for seeking a connection between a terminal and a mobile radio system comprising a synchronization unit for establishing in response to a control signal if said connection can be achieved and a time-delay unit for producing, after an initial period, said control signal after a first waiting period, said time-delay unit producing said control signal again after a second waiting period if it is established that said connection cannot be achieved after said first waiting period, said time-delay unit further comprising means for fixing the duration of said second waiting period so that it is greater than that of said first waiting period, which device is implemented in a terminal having a battery whose capacity is represented by a capacity indicator and said time-delay unit comprises means for fixing at least one of said waiting periods according to said capacity indicator.

Thus an essential feature of the terminal is taken into account to optimize connection seeking.

Moreover, the time-delay unit produces the control signal continuously during the initial period.

It is preferable to carry out a plurality of successive synchronization attempts at the beginning of the connection seeking process.

Further, the time-delay unit preferably comprises means for limiting these waiting periods to a predetermined maximum time.

If this precaution were not taken, the waiting periods could become extremely long, which could prevent the terminal obtaining access to the mobile radio system.

The time-delay unit advantageously comprises means for fixing this maximum period allowing for the capacity indicator.

In a specific embodiment of the device the time-delay unit calculates the duration of the second waiting period by multiplying that of the first waiting period by a predetermined coefficient.

The time-delay unit can therefore be adapted to fix this predetermined coefficient according to the capacity indicator.

According to an additional feature of the device the synchronization unit carries out a predetermined number of power measurement cycles on all of the channels transmitted by the mobile radio system and the time-delay unit sets the number of cycles according to the capacity indicator.

The invention will now be described in more detail by means of one purely illustrative embodiment and with reference to the accompanying drawing.

BRIEF DESCRIPTION OF THE DRAWINGS

The drawing shows the main components of a terminal required to implement the invention.

DETAILED DESCRIPTION OF THE PREFERRED EMBODIMENT

In this embodiment the synchronization unit uses certain components of a terminal to implement its functions, these units possibly being used also for other purposes. This is standard practice. It will therefore be understood that the unit is represented by means of these components in order to clarify the description.

In a known manner, the terminal essentially comprises an antenna 1 to receive the various channels, a receive circuit 2 such as a frequency synthesizer connected to the antenna 1 and which selects from these channels a tuning channel T in response to a control signal R, a power measuring circuit 3 which produces a power signal P representing the power on the tuning channel T, and a control circuit 4 such as a microprocessor which produces the control signal R and which receives the power signal P and stores it in a working memory 5 by means of a data signal D at an address assigned to the tuning channel T by means of an address signal Ad.

Also in a known manner the control circuit 4 has access to the identity of all the channels that the terminal can receive. For example, there may be a channel memory 6 associating for each channel a set point value of the control signal R with an address in the working memory 5. Thus during a measurement cycle the control circuit 4 produces the control signal R with one of the set point values and stores the value of the power signal P in the working memory 5 at the address associated with this set point value in the channel memory 6. The control circuit repeats this operation for all set point values with the result that the working memory 5 contains a power value for each channel.

There may naturally be several measurement cycles, the power value stored in the working memory 5 then representing the average value of the power signal obtained during the various cycles. This operation is entirely familiar to the man skilled in the art and is therefore not described in more detail.

The remainder of the synchronization procedure is not described here as it forms no part of the present invention. There are numerous ways of implementing this process including that covered by the aforementioned GSM recommendations.

The same applies to the connection seeking process proper.

The synchronization unit is controlled by a time-delay unit 7 which can also utilize one or more components of the terminal, including the control circuit 4.

It is known for the time-delay unit to control the synchronization unit continuously during an initial period PI by means of a control signal and until synchronization is achieved. If synchronization is not achieved at the end of this initial period the synchronization unit communicates this fact to the time-delay unit which, in a routine procedure, produces the control signal again after a waiting period with the result that the synchronization unit carries out a number C of power measurement cycles. If synchronization is still not achieved the procedure is repeated in exactly the same way.

The time-delay unit comprises means for progressively lengthening the successive waiting periods in order to space out the periods of activation of the synchronization unit.

A simple way to achieve this is to initialize the waiting period to a particular duration W0. If the synchronization unit reports that synchronization has not been achieved the time-delay unit multiplies the waiting period by a predetermined coefficient K. Thus the nth waiting period will have a duration equal to that of the first multiplied by $K^{n-1}$. To prevent the waiting period acquiring an excessive duration the time-delay circuit limits the waiting period to a predetermined maximum value.

The invention allows for the fact that not all terminals can operate for the same time between recharging or replacement of the battery. It can distinguish between mobile terminals which operate from the battery of a vehicle, hand-portable terminals which have their own battery of more limited capacity and pocket-size portable terminals which have their own battery of even more limited capacity. The time-delay unit holds information which is referred to hereinafter for convenience as the capacity indicator and which reflects the battery capacity of the terminal. It also holds a table giving the initial period PI, the initial waiting period W0, the number C of power measurement cycles to be carried out and the maximum value WMAX of the waiting period for the capacity indicator concerned. Ideally this table contains previous values for all possible values of the capacity indicator. The time-delay unit is therefore the same irrespective of the terminal and selects from the table the values corresponding to the capacity indicator (information) of the terminal in which it is implemented. The following values give just one numerical example:

for a mobile terminal:
- initial period PI: 60 minutes,
- initial waiting period W0:6 minutes,
- number C of measurement cycles: 3,
- maximum waiting period WMAX: 15 minutes for a hand-portable terminal:
- initial period PI: 15 minutes,
- initial waiting period W0:6 minutes,
- number C of measurement cycles: 3,
- maximum waiting period WMAX: 15 minutes for a portable terminal:
- initial period PI: 5 minutes,
- initial waiting period W0: 1 minute,
- number C of measurement cycles: 1,
- maximum waiting period WMAX: 10 minutes The initial period has been described as a period of uninterrupted operation of the synchronization unit. The invention is equally applicable if this period represents the time needed to carry out any number of measurement cycles. It also applies if this initial period has a null duration.

There is claimed:

1. Device for seeking a connection between a terminal and a mobile radio system comprising a synchronization unit for determining, in response to a control signal, whether said connection can be achieved and a time-delay unit for producing, after an initial period, said control signal after a first waiting period, said time-delay unit producing said control signal again after a second waiting period if said synchronization unit determines that said connection cannot be achieved after said first waiting period, said time delay unit further comprising means for fixing a duration of said second waiting period so that it is greater than that of said first waiting period, wherein said device is implemented in said terminal having a battery whose capacity is represented by capacity information held in said time-delay unit, and said time-delay unit comprises means for fixing at least one of said first and second waiting periods according to said capacity information.

2. Device according to claim 1 wherein said time delay unit produces said control signal continuously during said initial period.

3. Device according to claim 1 wherein said time-delay unit further comprises means for limiting said waiting periods to a predetermined maximum duration according to said capacity information.

4. Device according to claim 3 wherein said time-delay unit comprises means for fixing said maximum duration according to said capacity information.

5. Device according to claim 1 wherein said time-delay unit calculates the duration of said second waiting period by multiplying that of said first waiting period by a predetermined coefficient said predetermined coefficient being fixed according to said capacity information.

6. Device according to claim 1 wherein said synchronization unit carries out a predetermined number of power measurement cycles on all channels transmitted by said mobile radio system and said time-delay unit fixes said number of cycles according to said capacity information.

* * * * *